Dec. 26, 1922.

A. D. COLE ET AL.
LOADING ATTACHMENT FOR TRACTORS.
FILED SEPT. 20, 1920.

1,439,948

3 SHEETS-SHEET 1

Inventors
Arthur Dennis Cole
David Franklin Geiger
By Bradbury + Caswell
Attorneys

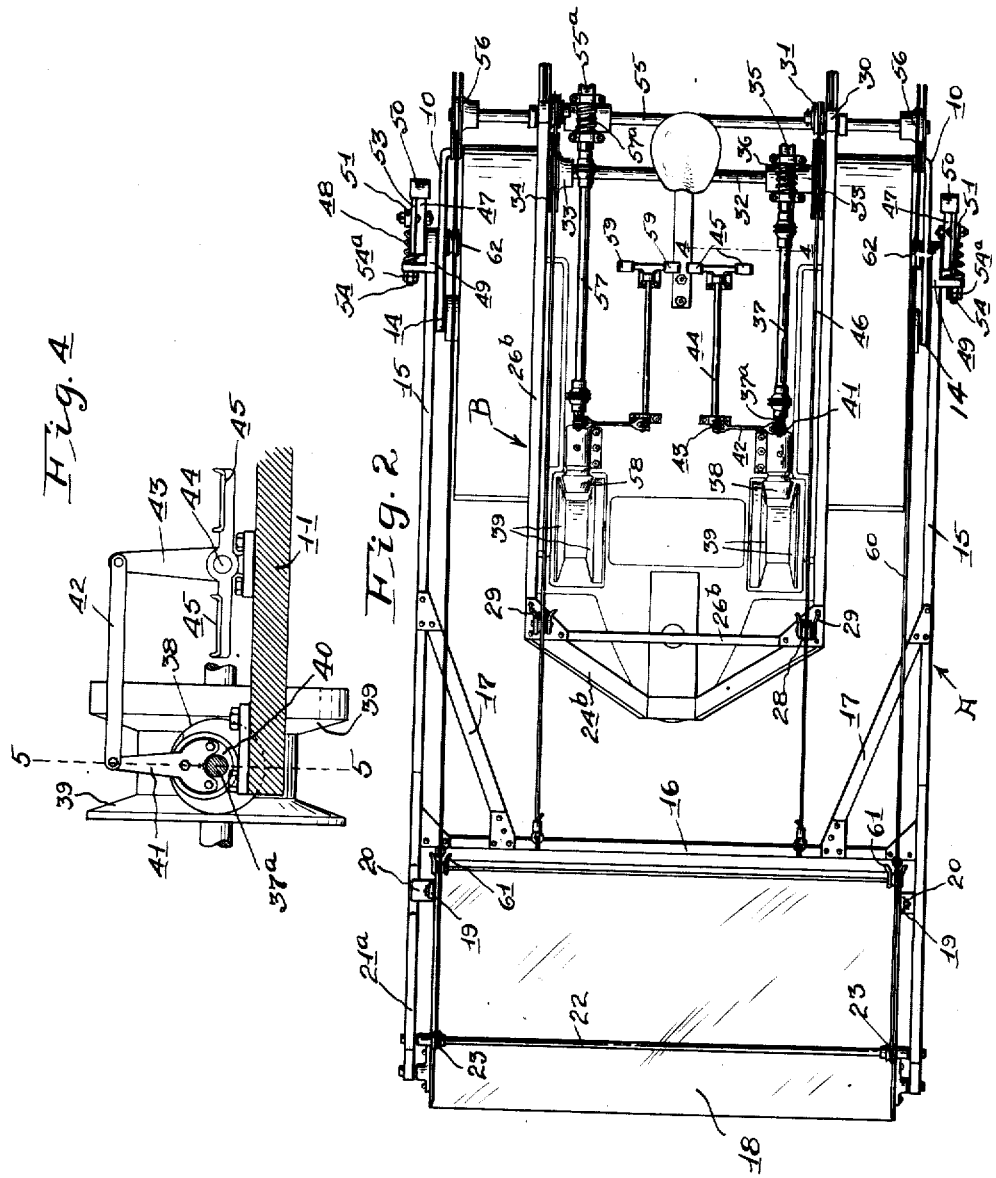

Dec. 26, 1922.

A. D. COLE ET AL.
LOADING ATTACHMENT FOR TRACTORS.
FILED SEPT. 20, 1920.

1,439,948

3 SHEETS-SHEET 3

Inventors
Arthur Dennis Cole
David Franklin Geiger
By Bradbury + Caswell
Attorneys Patented Dec. 26, 1922.

1,439,948

UNITED STATES PATENT OFFICE.

ARTHUR DENNIS COLE AND DAVID FRANKLIN GEIGER, OF MINNEAPOLIS, MINNESOTA.

LOADING ATTACHMENT FOR TRACTORS.

Application filed September 20, 1920. Serial No. 411,557.

*To all whom it may concern:*

Be it known that we, ARTHUR DENNIS COLE and DAVID FRANKLIN GEIGER, citizens of the United States, residing in the city of Minneapolis, county of Hennepin, and State of Minnesota, have invented new and useful Improvements in Loading Attachments for Tractors, of which the following is a specification.

Our invention relates to improvements in loading attachments for tractors.

Its object is to provide a simple, durable and inexpensive attachment of this kind having a loading mechanism adapted to be operated by tractor mechanism and designed to dump loads at any point between receiving position in front of the tractor and the other extreme at the rear and above the tractor, said attachment being designed to be operated by the tractor attendant and being capable of performing various classes of work, namely, the loading of grain or corn shocks, hay, straw, manure, coal, grain or other loose material from the ground to a vehicle at the side of the tractor or into a vehicle drawn thereby, also road work comprising light grading, crowning of road surfaces, or the like.

A further object is to provide a loading attachment for tractors including a vertically, oscillatory frame, a detachable mounting in which said frame may be adjustably pivoted, a scoop or the like on said frame, tilting mechanism operated by the tractor mechanism an adapted to swing the frame upward from loading position on the ground and, if desired, far enough to the rear to carry the frame beyond its pivotal support and pitch the load from the scoop, mechanism also operated by the tractor mechanism and adapted to tip the scoop at any point desired and yielding means to arrest the rearward swing of the frame and return it to position forward of its pivotal support, said frame being adapted to drop by gravity from upright position to loading position and to be controlled in its fall by said tilting mechanism.

With the foregoing and other objects in view, which will appear in the following description, the invention resides in the novel combination and arrangement of parts and in the details of construction hereinafter described and claimed.

Figure 1:
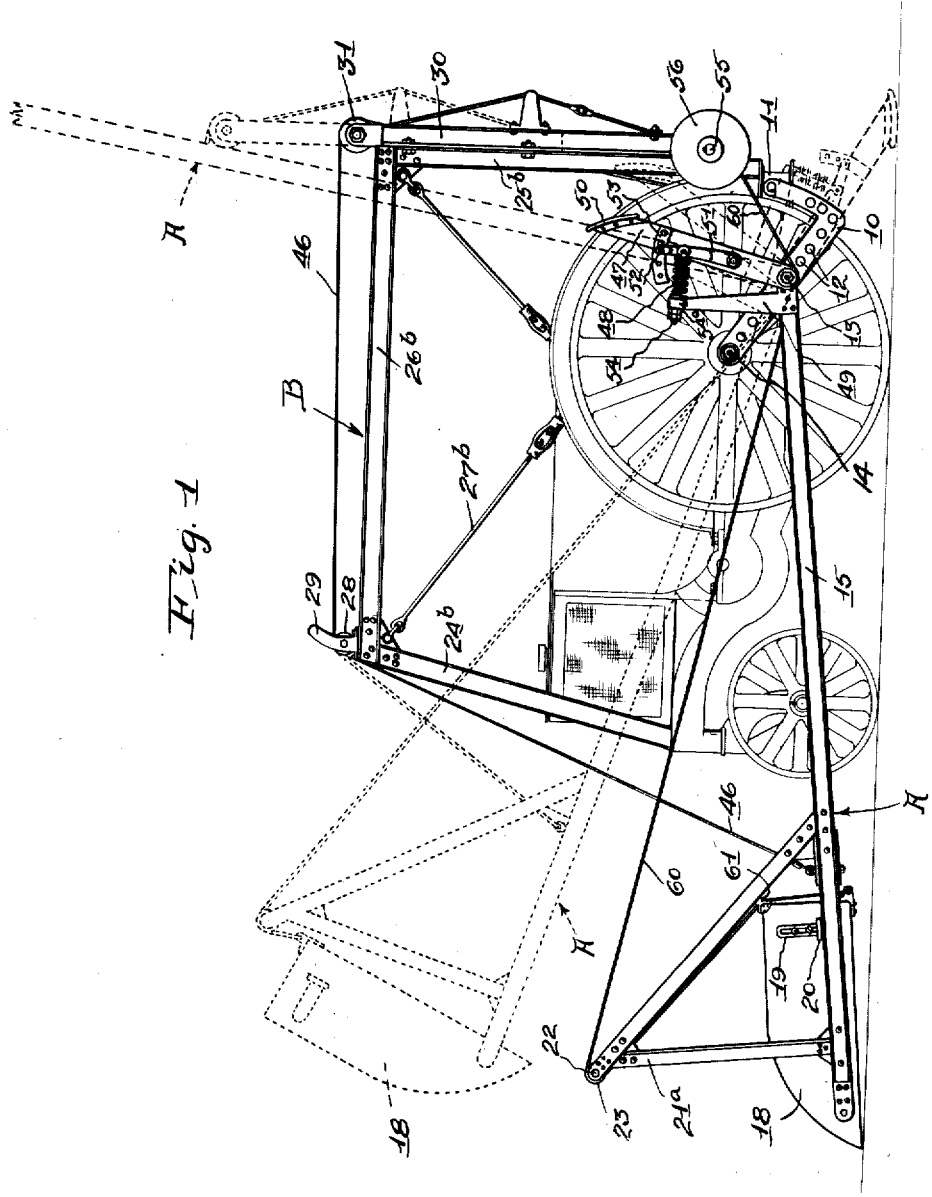
Figure 5:
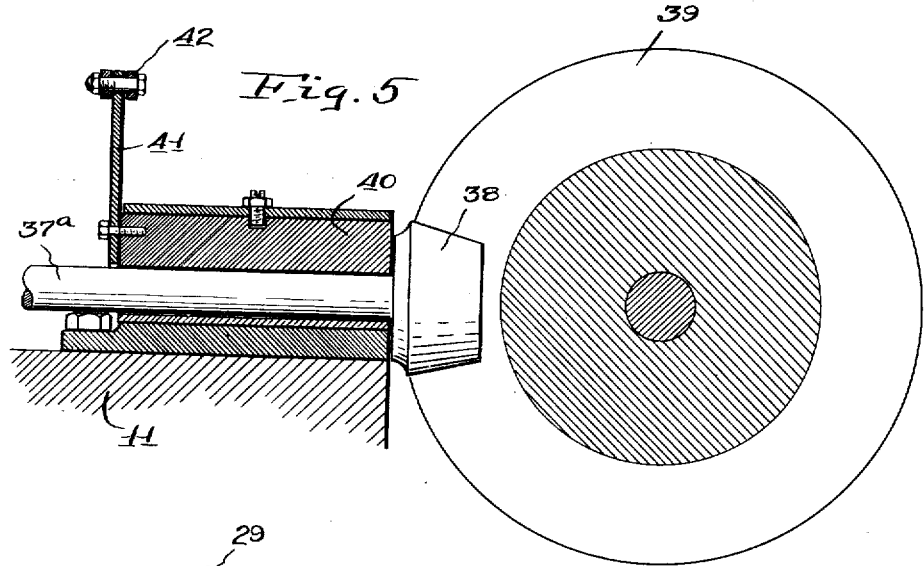
Figure 3:
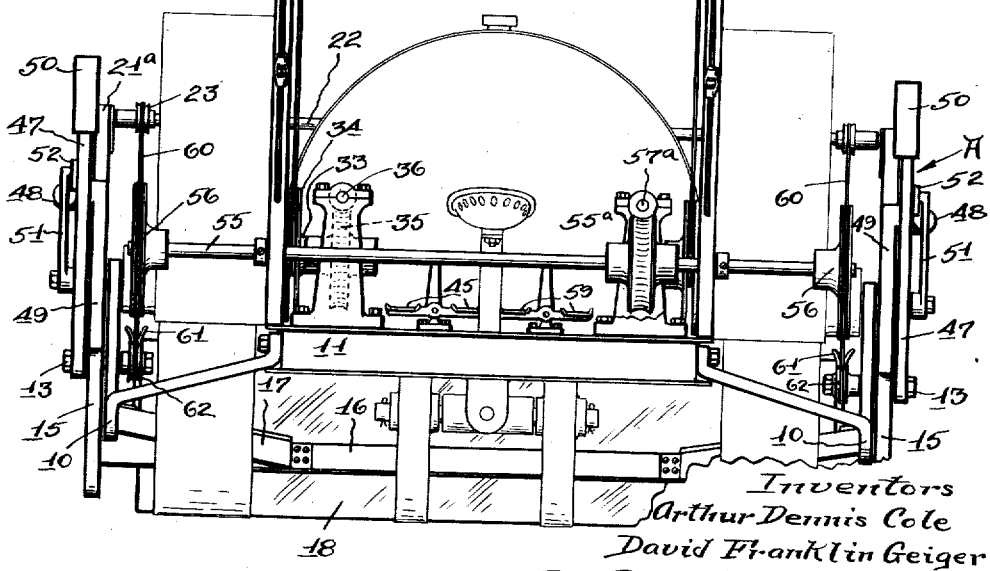

In the drawings, Fig. 1 is a side elevation of a tractor with one embodiment of our improved loading attachment applied thereto; Fig. 2 is a plan view thereof; Fig. 3 is a rear elevation of the same; Fig. 4 is a detail sectional view taken on the line 4—4 of Fig. 2, and Fig. 5 is an enlarged sectional view taken on the line 5—5 of Fig. 4.

The tractor illustrated in the drawings is selected as best suited for use in connection with our improved loading attachment, but it will be understood that other forms or types of tractors may also be employed.

Referring to the drawings, we have used the reference numeral 10 to indicate hanger members, which are suitably attached to the tractor. These hanger members are substantially V shape, each arm thereof having a row of openings 12 therein to receive a bolt 13 upon which one beam of a tiltable frame member A is pivoted. The openings 12 at various elevations and at various longitudinal positions with respect to the tractor frame provide for pivoting the tiltable frame in various vertical and longitudinal positions. Said hangers 10 are suitably anchored at their ends to the tractor. In the present instance, the forward ends of the hangers are secured to the ends of the dead axle 14 of the tractor and the rear ends are secured to the tractor frame 11. The tiltable frame A includes two side beams 15, the rear ends thereof being pivoted on the bolts 13 above described. A tie beam 16 joins said side beams 15 near the forward ends thereof and braces 17 are arranged between said side and tie beams. A scoop 18, slip, fork or other similar carrying receptacle is suitably pivoted at its ends and near its receiving side to the beams 15 of the tiltable frame A. Normally, the rear of the scoop rests between said beams and is held at the desired inclination with respect thereto by stops 19 adjustably secured to the sides of the scoop and supplied with lugs 20 overlapping the upper edges of said beams 15. Supplementary upright frames 21ª are mounted upon the forward end of the tiltable frame A. A transverse shaft 22 carried in the peaks of said supplementary frames and well forward of the rear of the scoop 18 is supplied with sheaves 23 for purposes as will presently appear. The tiltable frame A is swung upward and regulated in its fall by mechanism which will now be described. A detachable superstructure B including forward and rear uprights 24ᵇ and 25ᵇ joined at their upper ends by tie braces 26ᵇ and suitably reinforced by adjustable stay rods 27ᵇ are applied in suitable manner to a tractor frame. Near the forward end of the superstructure we have placed a pair of sheaves 28, each sheave being equipped with ears or guides 29 so placed as to direct a cable thereupon. At the rear of the superstructure we have supplied vertically adjustable reaches 30, each reach being equipped at its upper end with a sheave 31. A drum-shaft 32 suitably mounted upon the tractor frame is supplied with winding drums 33, the flanges 34 on each drum being sufficiently close together to cause the turns of a cable thereon to wrap one upon the other. Said drum shaft is preferably worm driven from the tractor mechanism. In the present instance, we employ a worm wheel 35 on the drum shaft 32 and a worm 36 in mesh with said worm wheel, the latter being connected through a double jointed shaft 37 with a friction wheel 38 adapted to be thrown into frictional engagement with a double faced driving member 39 of the tractor mechanism. The section 37ᵃ of said jointed shaft 37, carrying the driven friction wheel 38, is journaled in an eccentric bushing 40 mounted upon the tractor frame. An arm 41 on said bushing is joined through a link 42 with an arm 43 on a rock shaft 44, said rock shaft being turned to the right or to the left by opposed pedals 45 thereon. A pair of lifting cables 46 are supplied to raise the tiltable frame A. Each cable 46 passes over a pulley 28 and 31 on one side of the superstructure, the forward end thereof being attached to the tie beam 16 and the rear end thereof being attached to the drum 33 on the corresponding side. Pressure upon one of the pedals 45 engages the driven friction wheel 38 with one of the driving faces 39 and causes the cables 46 to be wound, turn upon turn, upon the drums 33, thus causing the tiltable frame to be elevated. By discontinuing such pressure the elevation of the tiltable frame A may be arrested at any point and said frame will remain secure at such desired point, owing to the locking action of the intermeshing worm 36 and worm wheel 35. Pressure brought to bear upon the opposed pedal 45 causes the friction wheel 38 to engage the opposed driving face 39, whereupon the drums 33 are turned in a direction to unwind the cables 46 and the tiltable frame is lowered by gravity under the control of the cables 46.

It will be observed that the greatest lifting strain occurs when the tiltable frame A is in substantially horizontal or receiving position and that this strain diminishes as said frame approaches upright position. Through the construction of our drums 33 as above described, whereby one turn of each cable is wrapped upon the next, we provide for meeting the greatest strain when the lifting mechanism is at its highest point of efficiency. This not only operates to render constant the strain upon the hoisting parts, but provides for slower initial lifting movement in the elevating process and faster movement as the scoop or other receptacle clears the work. A still further advantage resides in this construction and fits the present device for a special and particularly desirable function, that is, for pitching loads from the scoop, or other similar device such as a fork or the like. In some classes of work such as the loading of grain shocks, we contemplate hitching a hay rack to the rear of the tractor and pitching the shocks from the ground, over the tractor, and into the rack. In accomplishing this kind of work, the accelerated speed of the tiltable frame as it approaches upright position is necessary in order to pitch the load from the fork or other carrier at the point of discharge. To best pitch a load from a carrier in upright position of the tiltable frame, it is desirable to carry said frame slightly over its pivotal center and stop the same with substantial abruptness. We provide means for accomplishing this and also for returning the frame A forward of its pivotal center so that it will fall by gravity to loading position, when the lifting cables 46 are again paid out. A leg 47 is pivoted on each of the bolts 13, upon which the beams 15 are pivoted. A compression spring 48 is interposed between each leg 47 and an arm 49 rigidly secured to its companion beam 15. Each leg is fitted at its free end with a shoe 50 and said legs 47 and arms 49 are so arranged with respect to the beams 15, that the shoes 50 will strike the ground slightly before the frame A reaches vertical position in its backward throw. The impingement of the shoes against the ground sets up, through the compression springs 48, a yielding resistance against further rearward movement of the frame. These springs 48 are sufficiently strong to completely arrest the throw of the frame approximately at the upright position shown in dotted lines in Fig. 1. By thus suddenly stopping the throw of the frame A, it will be seen that a load may be readily pitched from a carrier thereon. Expansion of the springs 48 operates to carry the frame forward of its pivotal center so that the lowering of said frame to receiving position is assured. The employment of the ground as an abutment to receive the impact of the frame A relieves the mechanism from considerable strain. The springs 48 are held in place between the arms 49 and legs 47 and the connections between said springs and legs are made adjustable, as follows:

A link 51 pivoted at one end upon a leg 47 is adjustably secured at its other end by means of a bolt 52, in various positions on an apertured quadrant 53 also attached to said leg. A bolt 54, having the head thereof pivoted on said link, slidably passes through the end of the companion arm 49. This bolt carries a spiral spring 48, which is interposed between the arm 49 and link 51 and nuts 54 on the end of said bolt secures said spring under desired tension. The adjustment between the legs 47 and arms 49 provides for engaging the shoes 50 with the ground at the desired upright position of the frame A in all of its various points of adjustment on the hangers 10.

In handling heavy materials, such as earth, loose grain, manure and the like, it is desirable to dump the carrier 18, which in such work is ordinarily a scoop, at relatively low points (see dotted lines, Fig. 1). We provide mechanism for lifting the rear of the scoop whereby the contents thereof may be discharged over its receiving edge. We do not limit ourselves to the type of scoop shown or to the method of emptying the same, but we wish to call attention to the fact that the forwardly dumping scoop illustrated herein, has one particular advantage, viz: the cutting edge of the scoop is cleared by the material discharged therefrom. We provide dumping mechanism which is substantially a duplication of the lifting mechanism for the tiltable frame. It includes a drum shaft 55, drums 56, jointed shaft 57, worm wheel 55ª on 55, worm 57ª on 57, friction driven wheel 58 and actuating pedals 59 therefor, all parts similar thereto having been described in connection with the lifting mechanism. Cables 60 are attached at their forward ends to the lower rear edge of the scoop 18. Said cables are passed through guiding ears 61 on the upper rear edges of said scoop, thence over the sheaves 23 on the shaft 22, thence under sheaves 62 on the bolts 13 in the hangers 10 and finally to the winding drums 56 where they are attached.

The adjustment for the frame A provided in the hangers 10 allows for bringing the weight of said frame at desired points upon the tractor and, further, results in varied inclinations of said frame at receiving positions. The adjustment of the legs 47 with respect to the frame A compensates for variations in the different pivotal positions of the latter and the provision for elevating the reaches 30 permits the swinging of the frame A to extreme rearward position, when it is desired to pitch loads to the rear.

In use, the carrier (scoop or fork) is lowered to receiving position; the tractor is driven forward to load the carrier and one of the pedals 45 is actuated to lift the frame A. If it is desired to pitch the load into a vehicle at the rear of the tractor, the frame A is thrown to its rearward extremity as above described, or if it is desired to discharge the load at a lower elevation, for example, on the ground at a point removed from the receiving point or into a vehicle at the side of the tractor, the tractor is turned in the direction desired and the carrier 18 tipped to discharge its load by actuating one of the pedals 59. The carrier is permitted to drop back to normal position under control of the cables 60, which are paid out from the drums 56, when pressure is brought to bear upon the reversing pedal 59 and the frame A is permitted to return to receiving position, under control of the lifting cables 46, when pressure is brought to bear upon the reversing pedal 45.

Changes in the specific form of our invention, as herein disclosed, may be made within the scope of what is claimed without departing from the spirit of our invention.

Having described our invention, what we claim as new and desire to protect by Letters Patent is:

1. In a device of the class described, the combination with a tractor, of a vertically oscillatory frame having a pivotal mounting on said tractor capable of vertical and longitudinal adjustment thereon, a receptacle on the free end of said frame, means operated from the tractor mechanism and adapted to swing the frame upwardly and rearwardly and an adjustable yielding abutment associated with the frame, said abutment being arranged to strike the ground and arrest the throw of said frame.

2. In a device of the class described, the combination with a tractor of a vertically oscillatory frame having a pivotal mounting on said tractor, a receptacle on the free end of said frame, lifting means adapted to raise the frame with accelerating speed and a yielding abutment associated with the frame, said abutment being arranged to strike the ground and arrest the throw of said frame.

3. In a device of the class described, the combination with a tractor, of a vertically oscillatory frame having a pivotal mounting on said tractor, a receptacle on the free end of said frame, and lifting means to raise the frame, a yielding abutment associated with the frame, said abutment being arranged to strike the ground and arrest the throw of said frame.

4. In a device of the class described, the combination with a tractor, of a vertically oscillatory frame having a pivotal mounting on said tractor, a scoop tiltably mounted on said frame and having adjustable means for fixing the inclination thereof at loading position with respect to said frame, frictionally operated self-locking means driven from the tractor mechanism and adapted to raise the frame and tilt the scoop, said frame and scoop being adapted to return to receiving positions by gravity under the control of said operating means.

5. In a device of the class described, the combination with a tractor of a vertically oscillatory frame adjustably pivoted at the rear of said tractor and designed to extend forwardly thereof, a receptacle on the free end of said frame, a superstructure on said tractor having vertically adjustable reaches at the rear thereof, a pair of power driven winding drums, lifting cables attached to said drums, sheaves upon said reaches, sheaves upon the forward ends of said superstructure, said cables being passed from said drums over said sheaves and attached at their forward ends to said frame, said drums being of such width as to cause one turn of each cable to wind upon another, whereby upon operation of the drums to wind in the cables, said frame is elevated at accelerating speed.

6. In a device of the class described, the combination with a tractor of a vertically oscillatory frame adjustably pivoted on said tractor, a scoop tiltably mounted upon the free end of said frame, means for lifting the frame, a cable attached to the scoop, a sheave journaled on the pivotal axis of said oscillatory frame, said cable being guided by said sheave and means for winding in and paying out said cable to tip and empty the scoop and to permit its return to receiving position.

7. In a device of the class described, the combination with a tractor of V shaped apertured hangers secured at their ends to said tractor, a frame, bolts for adjustably and pivotally mounting one end of the frame on said hangers, whereby said frame is free to swing vertically, a carrier on the free end of the frame, means for tilting the frame upwardly to and slightly beyond vertical position, legs pivoted on said bolts, apertured quadrants fixed on said legs, links pivoted on the legs and adjustably secured at their free ends to said quadrants, arms on said frame, and spiral compression springs interposed between said arms and links, said legs being designed to strike the ground and arrest the rearward movement of the frame and said springs being designed to return said frame forward of upright position to permit the same to be lowered forwardly by gravity.

8. In a device of the class described, the combination with a tractor of a vertical oscillatory frame thereon adapted to be tilted by gravity to position in front of the tractor, a receptacle on the free end of said frame, means for swinging the frame upwardly and rearwardly and legs yieldingly held in predetermined position with respect to the frame, said legs being designed to strike the ground slightly before the frame reaches upright position and to arrest the movement of said frame at position slightly to the rear of upright position, whereby a load in the carrier is caused to be pitched rearwardly and said frame is thereafter caused to be returned forward of upright position.

9. A loading attachment for tractors comprising a frame adapted to be removably pivoted on a tractor, a receptacle on said frame and operating means for raising and lowering said frame, said means including a hoisting cable, a winding drum designed to receive the turns of said cable, one upon the other and worm driven propelling mechanism for said drums adapted to be geared with the tractor mechanism.

10. A loading attachment for tractors comprising a frame adapted to be removably pivoted on a tractor and designed to be lifted by power with steadily increasing speed and lowered by gravity, a receptacle on said frame, a winding drum, a hoisting cable connecting said frame and drum and means for turning the drum to wind in the cable connecting said frame and drum and ment of said drum in the paying out of the said cable.

In testimony whereof, we have signed our names to this specification.

ARTHUR DENNIS COLE.
DAVID FRANKLIN GEIGER.

Certificate of Correction.

It is hereby certified that in Letters Patent No. 1,439,948, granted December 26, 1922, upon the application of Arthur Dennis Cole and David Franklin Geiger, of Minneapolis, Minnesota, for an improvement in "Loading Attachments for Tractors," an error appears in the printed specification requiring correction as follows: Page 4, line 89, claim 10, strike out the words "connecting said frame and drum and" and insert instead *and for controlling the reverse move-;* and that the said Letters Patent should be read with this correction therein that the same may conform to the record of the case in the Patent Office.

Signed and sealed this 23d day of January, A. D., 1923.

[SEAL.]

KARL FENNING,
*Acting Commissioner of Patents.*